June 19, 1945.  V. D. POPOV  2,378,579
MEANS FOR CONVEYING MATERIAL FROM ONE MACHINE TO ANOTHER
Filed Jan. 23, 1940  2 Sheets-Sheet 1
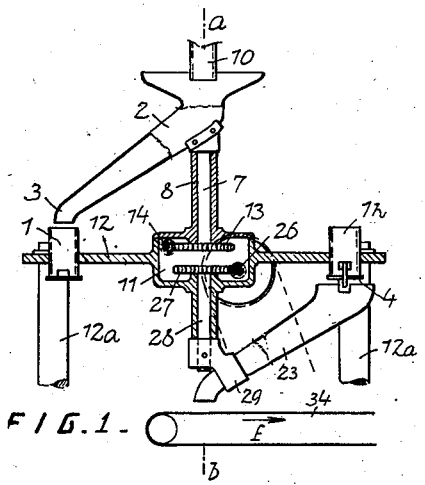
FIG. 1.
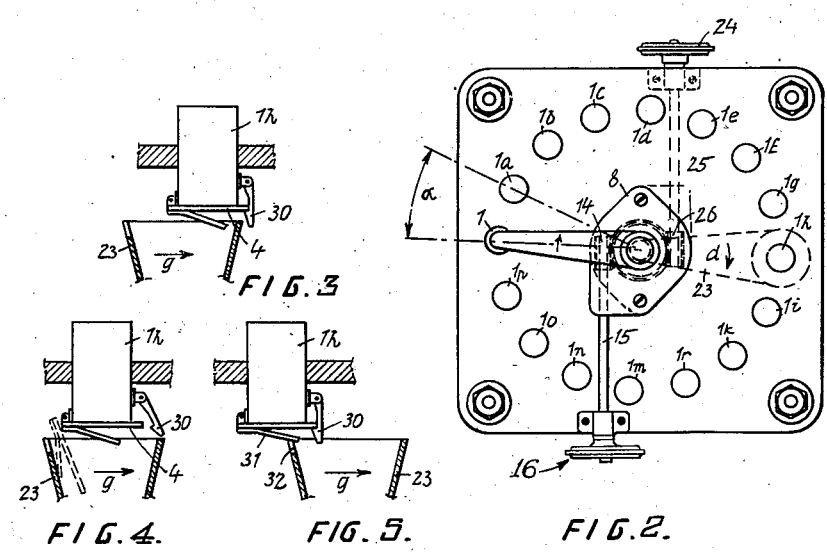
FIG. 3.
FIG. 4.  FIG. 5.  FIG. 2.
Inventor,
V. D. Popov
By: Glascock Downing & Seebold June 19, 1945.  V. D. POPOV  2,378,579
MEANS FOR CONVEYING MATERIAL FROM ONE MACHINE TO ANOTHER
Filed Jan. 23, 1940  2 Sheets-Sheet 2

Inventor,
V. D. Popov

Patented June 19, 1945

2,378,579

UNITED STATES PATENT OFFICE 2,378,579

MEANS FOR CONVEYING MATERIAL FROM ONE MACHINE TO ANOTHER

Vladimir Dmitrijevič Popov, Prague-Bubenec, Bohemia and Moravia; vested in the Alien Property Custodian Application January 23, 1940, Serial No. 315,260
In Czechoslovakia February 2, 1939

8 Claims. (Cl. 198—26)

This invention relates to apparatus for transferring batches of material or articles from one material or article handling machine to another material or article handling machine, such as from an automatic weighing machine to an automatic packaging machine, which machines may operate at different rates of speed, that is, the batches may be weighed out and discharged by the weighing machine or the like intermittently at different time intervals from those which separate the intermittent packaging operations of the packaging machine.

In order to illustrate the invention, exemplary embodiments thereof are described in this specification and are shown in the accompanying drawings, wherein Figure 1 is a sectional and side elevational view of an embodiment of the invention;

Figure 2 is a top plan view of Figure 1;

Figures 3, 4 and 5 are sectional and elevational views showing in progressive stages the opening and closing of material or article receiving receptacles during the operation of the transfer machine;

Figure 6:
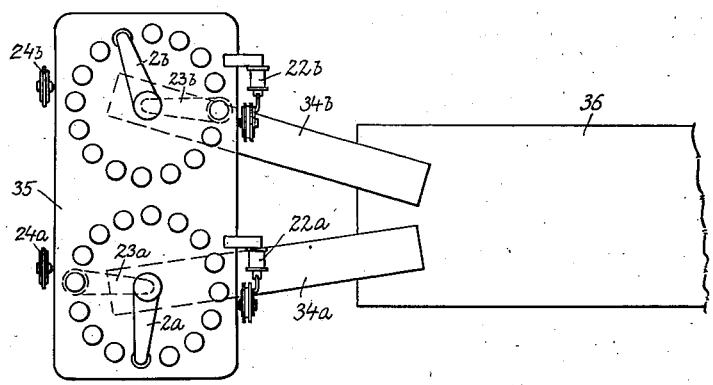
Figure 6 is a top plan view of a dual transfer machine.

Neither the weighing or similar machine nor the packaging or similar machine with which the device of the invention may be associated are shown in the drawings, because the nature of machines in these categories are well understood and their construction forms no part of the present invention.

The embodiment of the invention shown in Figures 1 through 5 comprises the outwardly declining receiving and distributing chute 2 which is rotatably mounted on a vertical rotary shaft 7 operating in the bearing 8 mounted on the cover of the chamber 11 on the fixed table 12. The enlarged upper end or hopper portion of the chute 2 is in receiving relation to the supply conduit 10, which leads from the discharge of the weighing machine. The lower discharge end 3 of the chute is positioned to discharge into any of the circular series of receptacles 1 which are mounted on the table 12. The table is supported by columns 12a.

Means for driving the chute 2 so that it will move intermittently into discharge relation to successive ones of the receptacles 1, in synchronism with the intermittent discharge of batches of material or articles by the weighing machine, comprises the worm shaft 15 having the worm 14 in mesh with the wormwheel 13 on the lower end of the shaft 7 within the chamber 11. The worm shaft 15 has fixed thereon a pulley 16 arranged to be driven by a belt or other suitable means from the first or weighing machine in synchronism with such machine.

As a result, the chute 2 is turned from one receptacle to the next succeeding receptacle, where it stops while the next receptacle is receiving its charge of articles from the chute 2. The chute 2 then moves on to the next receptacle, and these operations continue until the weighing machine is stopped or the present apparatus is disconnected therefrom.

The receptacles 1 have hinged bottoms 4, as shown in Figure 1, and more in detail in Figures 3, 4 and 5, which have declining leaf spring tongues 31 on their lower side and projecting in the direction of rotation of the lower revoluble chute 23 which discharges to the packaging machine or the like. Depending latches 30 on the receptacles 1 hold the receptacle bottoms closed until the forward edge of the discharge chute 23 moves into engagement therewith as shown in Figures 3 and 4 and disengages the latch to permit the receptacle bottom to fall gravitationally and empty the contents of the receptacle into the hopper 23. The receptacle bottom is then cammed into closed position by engagement of the rearward edge of the chute 23 with the declining spring 31 as shown in Figure 5, whereat the latch 30 acts to hold the bottom 4 closed until the chute 23 returns and opens it again.

The revoluble discharging chute 23 which discharges to the packaging machine or the like is synchronized therewith by being driven by a belt or chain trained over the pulley 24 on the shaft 25 which extends into the chamber 11 and has a worm 26 meshed with the wormwheel 27 which is attached to the upper end of the pivot pin 28. The lower end of the chute is secured to the lower end of the pivot pin 28 by means of the holder or bracket 29.

The lower end of the chute 23 may discharge or deliver the articles directly to the packaging machine or may deposit the articles onto a conveyor belt 34 leading to the packaging machine, as shown in Figure 1.

In some instances single weighing or measuring machines do not have the speed or capacity to keep up with a single packaging machine. In such cases more than one weighing or measuring machine may be associated with a single packaging machine, as illustrated in Figure 6. In this case on a common table 25 two circular groups of receptacles are arranged, each group being served by its own chute 2a, 2b, respectively, which are driven from corresponding individual pulleys or chain wheels 24a, 24b, at speeds conforming to the performance of the weighing or measuring machine. The discharge chutes 23a and 23b alternately receive the batches of articles, so that the corresponding conveyor belts 34a and 34b transfer the individual batches of articles or materials in alternate positions, onto the common conveyor belt 36 which delivers the batches to the packaging machine.

Figure 7:
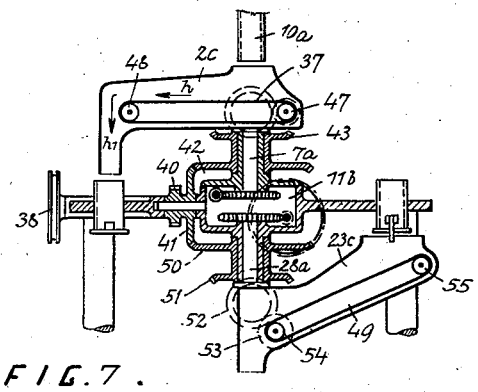
Figure 7 is sectional and elevational view of another form of transfer machine employing conveyor belts in its intake and discharge conduits; and, Figure 8 is a top plan view of Figure 7.
Figure 8:
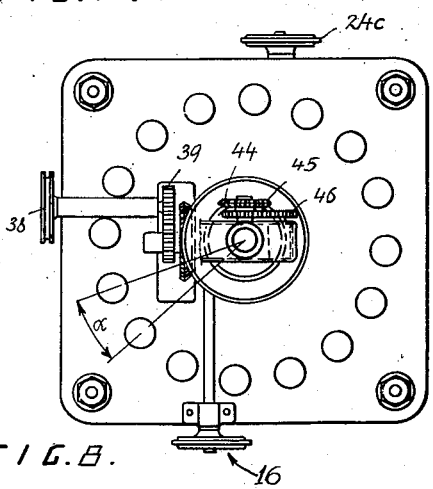

The embodiment of the invention shown in Figures 7 and 8 differs from those described above in that the revoluble chute 2c is provided with an internal conveyor belt 37 which moves in the direction of the arrow h, whereby the material or articles coming from the weighing or measuring machine through the conduit 10a, falls on the belt 37 and is carried to the discharge opening of the chute, through which the material then falls into whichever of the receptacles may be at the time disposed thereunder. This arrangement is especially advantageous for the handling of coherent or fibrous material.

As shown in Figures 7 and 8, motion may be imparted to the conveyor belt 37 by a belt pulley 38 whose shaft has a pinion 39 which drives one of the belt carrying rollers 47, 48 through the interengaged gears 40, 41, 42, 43, 44, 45 and 46. The chute 23c may also be provided with an internal conveyor belt 49 which is trained over the rollers 54 and 55, the latter being driven by the gear 41 through the gears 50, 51, 52 and 53.

It is obvious that where the described transfer machine is used with weighing and packaging machines operating at regular coordinated rates, both of the revolving chutes must be driven according to the rates of operation of the weighing and packaging machines. Suitable mechanism, either electrically or mechanically operated can be provided for this purpose.

Where a weighing machine and a packaging machine associated with the present transfer machine operate at greatly irregular rates or at substantially uncoordinated rates, so that conditions of over accumulation of articles in or of starving of the receptacles develop, it is of course necessary to slow down or stop either the weighing machine or the packaging machine. Either of these controls can be exercised either by a person in attendance or by the use of known mechanical or electrical means.

I claim:

1. In a device for transferring articles or batches of articles between a weighing machine and a packaging machine, said device comprising an intermittently movable chute arranged to receive the articles from the weighing machine, a plurality of linearly spaced receptacles into each of which said chute is arranged to successively deposit a weighed article or batch of articles, a receiver into which said receptacles are arranged to discharge, delivering means for conveying individual articles or batches of articles from said receiver to utilization means, and intermittent driving means for driving said movable chute from receptacle to receptacle in synchronism with the discharge of weighed batches from the weighing machine.

2. A transfer device for receiving a plurality of weighed articles or batches of articles from a weighing machine or the like and synchronously delivering the articles or batches of articles individually to a packaging machine or the like, said transfer device comprising a distributor including a movable chute into which the articles or batches are individually received from said weighing machine, a plurality of linearly spaced relatively stationary receptacles with which said chute is arranged to register in succession in a complete movement of the chute, drive means for intermittently moving the chute and stopping it in registry to deposit an article or a batch of articles in each receptacle with which the chute registers whenever an article or batch of articles has been received in said chute from the measuring source in a corresponding position of the chute, a receiver into which the receptacles discharge, and delivering means for individually conveying articles or batches of articles from said receiver to said packaging machine.

3. A transfer device according to claim 1 wherein said receptacles are provided with bottoms which are normally closed and wherein said receiver comprises a movable conduit arranged to register successively with the individual receptacles to receive an article or a batch of articles therefrom and to convey the same to the packaging machine, closure operating means on said conduit to open the bottoms of the receptacles as the conduit comes into registry therewith and effect closing of the bottom as the conduit moves away from a receptacle with which it was registered, driving means for intermittently moving said conduit into registry with the receptacles, and means synchronizing said driving means with the operation of the packaging machine.

4. A transfer device according to claim 1 wherein said receptacles are provided with normally closed bottoms and wherein said receiver comprises a movable conduit arranged to register successively with the individual receptacles to receive an article or a batch of articles therefrom and to convey the same to the packaging machine, closure operating means on said conduit to open the bottoms of the receptacles as the conduit comes into registry with the individual receptacles and effect closing of the bottom as the conduit moves away from a receptacle with which it was registered, driving means for intermittently moving said conduit into registry with the receptacles, said drive means and said driving means moving said movable chute and said movable conduit at different rates of movement coordinated respectively with those of the weighing machine and the packaging machine.

5. A transfer device according to claim 1 wherein said receiver comprises a movable conduit having an entrance arranged to register with the individual receptacles to receive an article or a batch of articles therefrom, and a discharge for the articles, driving means for moving said conduit intermittently into registry with said receptacles, and conveyor belt means in said conduit for conveying the articles from the entrance of the conduit toward its discharge.

6. A transfer device according to claim 1 wherein said movable chute has an entrance communicating with said hopper and a discharge for registry with the receptacles, and a conveyor belt in said chute for conveying articles from said entrance toward said discharge.

7. A transfer device for receiving a plurality of articles or batches of articles from a weighing machine or the like and conveying the articles or batches of articles individually to a packaging machine or the like, said transfer device comprising a distributor including a hopper into which the articles or batches of articles are individually received from said weighing machine, a support, an inclined chute journalled on said support for turning on a vertical axis, a plurality of circumferentially spaced receptacles mounted on said support around said axis and with which the lower end of said chute is arranged to register in succession in a complete revolution of the chute, drive means for intermittently turning and stopping said chute in registry with individual receptacles to deposit an article or batch of articles therein whenever weighed articles or weighed batch of articles is released by said weighing machine into the hopper, a receiver into which the receptacles discharge, and delivering means for individually conveying articles or batches of articles from said receiver to said utilization means.

8. A transfer device according to claim 7 wherein said receptacles are provided with normally closed bottoms and wherein said receiver comprises an inclined conduit mounted on said support for turning on a vertical axis substantially parallel to the axis of the chute, the upper end of said conduit being arranged to register successively with each receptacle to receive an article or a batch of articles therefrom, closure operating means on the said upper end of the conduit for opening the bottom of the corresponding receptacle as the conduit moves into registry therewith and for effecting closing of the bottom as the conduit leaves such receptacle, and driving means for intermittently moving said conduit to register its upper end with individual receptacles.

VLADIMIR DMITRIJEVIČ POPOV.